United States Patent
Joshi et al.

(10) Patent No.: US 11,051,018 B2
(45) Date of Patent: Jun. 29, 2021

(54) TRANSFORMS FOR LARGE VIDEO AND IMAGE BLOCKS

(71) Applicant: GOOGLE LLC, Mountain View, CA (US)

(72) Inventors: Urvang Joshi, Mountain View, CA (US); Debargha Mukherjee, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/012,093

(22) Filed: Sep. 4, 2020

(65) Prior Publication Data
US 2020/0404273 A1  Dec. 24, 2020

Related U.S. Application Data

(63) Continuation of application No. 16/004,929, filed on Jun. 11, 2018, now Pat. No. 10,771,783.

(51) Int. Cl.
*H04N 19/122* (2014.01)
*H04N 19/176* (2014.01)
(Continued)

(52) U.S. Cl.
CPC ......... *H04N 19/122* (2014.11); *H04N 19/124* (2014.11); *H04N 19/159* (2014.11);
(Continued)

(58) Field of Classification Search
CPC .... H04N 19/115; H04N 19/12; H04N 19/122; H04N 19/15; H04N 19/152;
(Continued)

(56) References Cited

U.S. PATENT DOCUMENTS

| | | | |
|---|---|---|---|
| 4,189,748 A | 2/1980 | Reis | |
| 5,453,788 A * | 9/1995 | Matsushima | G06T 3/4084 348/395.1 |

(Continued)

OTHER PUBLICATIONS

Bankoski, et al., "Technical Overview of VP8, an Open Source Video Codec for the Web", Jul. 11, 2011, 6 pp.

(Continued)

*Primary Examiner* — Nathnael Aynalem
(74) *Attorney, Agent, or Firm* — Young Basile Hanlon & MacFarlane, P.C.

(57) ABSTRACT

Improved transforms are used to encode and decode large video and image blocks. During encoding, a prediction residual block having a large size (e.g., larger than 32×32) is generated. The pixel values of the prediction residual block are transformed to produce transform coefficients. After determining that the transform coefficients exceed a threshold cardinality representative of a maximum transform block size (e.g., 32×32), a number of the transform coefficients are discarded such that a remaining number of transform coefficients does not exceed the threshold cardinality. A transform block is then generated using the remaining number. During decoding, after determining that the transform coefficients exceed the threshold cardinality, a number of new coefficients are added to the transform coefficients such that a total number of transform coefficients exceeds the threshold cardinality. The transform coefficients are then inverse transformed into a prediction residual block having a large size.

19 Claims, 9 Drawing Sheets

(51) Int. Cl.
*H04N 19/82* (2014.01)
*H04N 19/18* (2014.01)
*H04N 19/159* (2014.01)
*H04N 19/124* (2014.01)

(52) U.S. Cl.
CPC ........... *H04N 19/176* (2014.11); *H04N 19/18* (2014.11); *H04N 19/82* (2014.11)

(58) Field of Classification Search
CPC .... H04N 19/176; H04N 19/186; H04N 19/60; H04N 19/91; H04N 19/94; H04N 19/129; H04N 19/18; H04N 19/184; H04N 19/625; H04N 19/117; H04N 19/82; H04N 19/59; H04N 19/182; H04N 19/124; H04N 9/8042
USPC ....................................... 375/240.01–240.29
See application file for complete search history.

(56) References Cited

U.S. PATENT DOCUMENTS

| | | | | |
|---|---|---|---|---|
| 6,600,785 | B1 * | 7/2003 | Nishigori | ............... G06T 3/4084 375/240.21 |
| 7,050,494 | B1 * | 5/2006 | Yamada | ................ H04N 19/112 375/240 |
| 7,295,613 | B2 | 11/2007 | Bjontegaard | |
| 9,769,486 | B2 | 9/2017 | Iwasaki | |
| 2003/0156648 | A1 * | 8/2003 | Holcomb | ............. H04N 19/105 375/240.18 |
| 2005/0249291 | A1 * | 11/2005 | Gordon | ................ H04N 19/176 375/240.18 |
| 2008/0192824 | A1 | 8/2008 | Lim et al. | |
| 2012/0099646 | A1 | 4/2012 | Coban et al. | |
| 2013/0003824 | A1 | 1/2013 | Guo et al. | |
| 2013/0022115 | A1 | 1/2013 | Oh | |
| 2013/0058407 | A1 | 3/2013 | Sole Rojals et al. | |
| 2017/0026645 | A1 | 1/2017 | Zhou et al. | |
| 2018/0098081 | A1 | 4/2018 | Zhao et al. | |
| 2018/0316920 | A1 | 11/2018 | Igarashi | |

OTHER PUBLICATIONS

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

Sole et al. "Transform Coefficient Coding in H EVC" IEEE 2012, 13 Pages. (Year: 2012).

* cited by examiner

TRANSFORMS FOR LARGE VIDEO AND IMAGE BLOCKS

CROSS-REFERENCE TO RELATED APPLICATION(S)

This disclosure is a continuation of U.S. patent application Ser. No. 16/004,929, filed Jun. 11, 2018, the entire disclosure of which is hereby incorporated by reference.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A method for decoding an encoded block according to an implementation of this disclosure comprises decoding quantized transform coefficients of the encoded block from a bitstream. The quantized transform coefficients are dequantized to produce a first number of transform coefficients associated with a transform block having a first size. Based on one or more syntax elements within the bitstream, a determination is made as to whether the first number of transform coefficients were encoded using a transform size which exceeds a threshold. Responsive to determining that the first number of transform coefficients were encoded using a transform size which exceeds the threshold, one or more zero value coefficients are added to the first number of transform coefficients to result in a second number of transform coefficients which is greater than the first number of transform coefficients. The second number of transform coefficients are inverse transformed to produce a prediction residual having a second size which is greater than the first size. A video block is reconstructed using the prediction residual and a prediction block for the encoded block. The video block is then output for storage or display.

An apparatus for decoding an encoded block according to an implementation of this disclosure comprises a processor configured to execute instructions stored in a non-transitory storage medium. The instructions include instructions to: decode quantized transform coefficients of the encoded block from a bitstream; dequantize the quantized transform coefficients to produce a first number of transform coefficients associated with a transform block having a first size; and determine, based on one or more syntax elements within the bitstream, whether the first number of transform coefficients were encoded using a transform size which exceeds a threshold. The instructions further include instructions to, responsive to a determination that the first number of transform coefficients were encoded using a transform size which exceeds the threshold: add one or more zero value coefficients to the first number of transform coefficients to result in a second number of transform coefficients which is greater than the first number of transform coefficients; and inverse transform the second number of transform coefficients to produce a first prediction residual having a second size which is greater than the first size. The instructions further include instructions to, responsive to a determination that the first number of transform coefficients were not encoded using a transform size which exceeds the threshold: inverse transform the first number of transform coefficients to produce a second prediction residual having the first size. The instructions further include instructions to: reconstruct a video block using a prediction block for the encoded block and using the first prediction residual or the second prediction residual; and output the video block for storage or display.

Another method for decoding an encoded block according to an implementation of this disclosure comprises dequantizing quantized transform coefficients of the encoded block to produce a first number of transform coefficients associated with a transform block having a first size. One or more zero value coefficients are added to the first number of transform coefficients to result in a second number of transform coefficients which is greater than the first number of transform coefficients. The second number of transform coefficients are inverse transformed to produce a prediction residual having a second size which is greater than the first size. The prediction residual is then processed to produce a decoded video block for output or display.

These and other aspects of this disclosure are disclosed in the following detailed description of the implementations, the appended claims and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Figure 1:
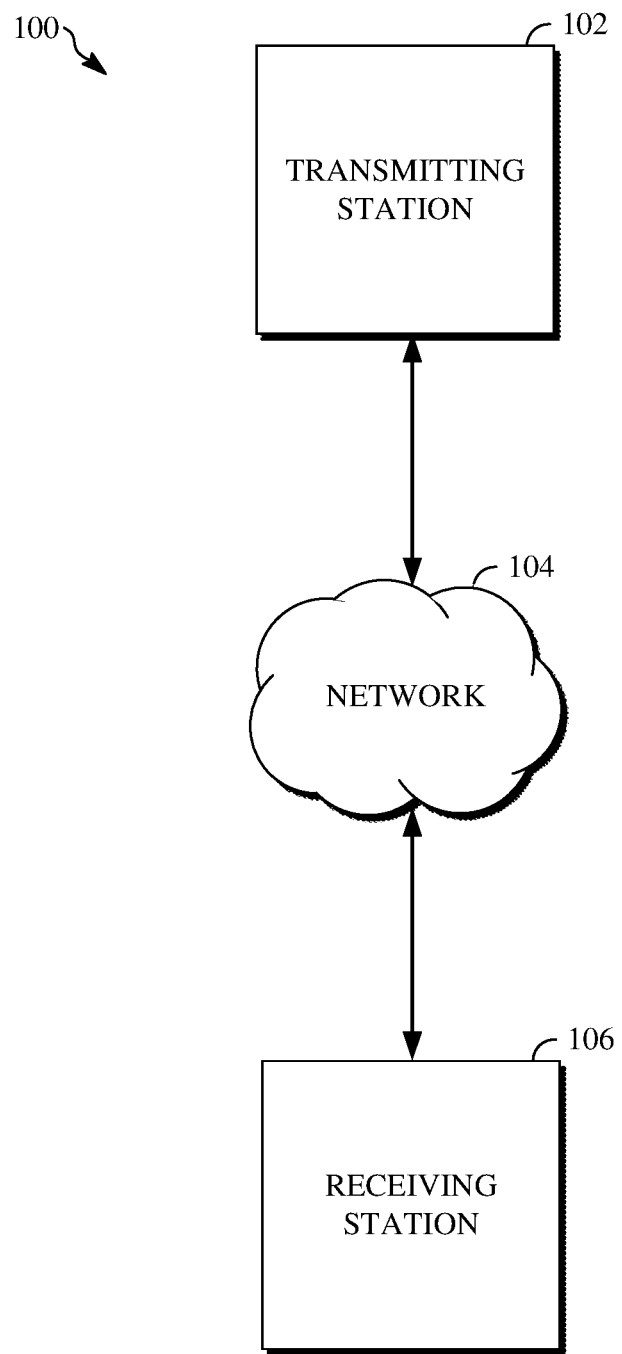
FIG. 1 is a schematic of an example of a video encoding and decoding system.

Video compression schemes may include breaking respective images, or frames, into smaller portions, such as blocks, and generating an encoded bitstream using techniques to limit the information included for respective blocks thereof. The encoded bitstream can be decoded to re-create the source images from the limited information. For example, a video compression scheme can include transforming pixel values of a prediction residual block of a current block into transform coefficients. The transform coefficients are quantized and entropy coded into an encoded bitstream. A decoder uses the encoded transform coefficients to decode or decompress the encoded bitstream to prepare the video stream for viewing or further processing, such as by decoding and outputting the current block to an output video stream.

There may be many different transform sizes available for transforming the pixel values of a prediction residual block, such as based on the size of the prediction residual block representing the prediction residual. For example, where the prediction residual block is 16×16, the transform size may be 16×16, 8×8, or 4×4. In some cases, a codec may be able to support macroblocks larger than 32×32. In one example, a codec may include support for 32×64, 64×32, and 64×64 macroblocks. However, the processing of a macroblock of such a large size requires a large amount of computing resources and storage, which is infeasible in a practical video codec. A solution for transforms using less computing resources and storage is desirable, particularly given the growing presence of high resolution (e.g., 1080p, 4K, etc.) video and image content.

Implementations of this disclosure address problems such as these using improved transforms for large video and image blocks. During encoding, a prediction residual block having a large size (e.g., larger than 32×32) is generated. The pixel values of the prediction residual block are transformed to produce transform coefficients. After determining that the transform coefficients exceed a threshold cardinality representative of a maximum transform block size (e.g., 32×32), a number of the transform coefficients are discarded such that a remaining number of transform coefficients does not exceed the threshold cardinality. A transform block is then generated using the remaining number. During decoding, after determining that the transform coefficients exceed the threshold cardinality, a number of new coefficients are added to the transform coefficients such that a total number of transform coefficients exceeds the threshold cardinality. The transform coefficients are then inverse transformed into a prediction residual block having a large size.

References are made throughout this disclosure to transform coefficients represented by transform blocks. As used herein, the representation of a number of transform coefficients by a transform block size refers to the number of transform coefficients that are included in a transform block of that transform block size. For example, a 32×32 transform block represents 1,024 transform coefficients because a 32×32 transform block includes 1,024 transform coefficients. Thus, a statement or other expression that transform coefficients are represented by a 32×32 block size means that there are 1,024 such transform coefficients. That statement or other expression also means that the cardinality of those transform coefficients is 1,024.

Further details of techniques for improved transforms for large video and image blocks are described herein with initial reference to a system in which they can be implemented, as shown in FIGS. 1 through 7. FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
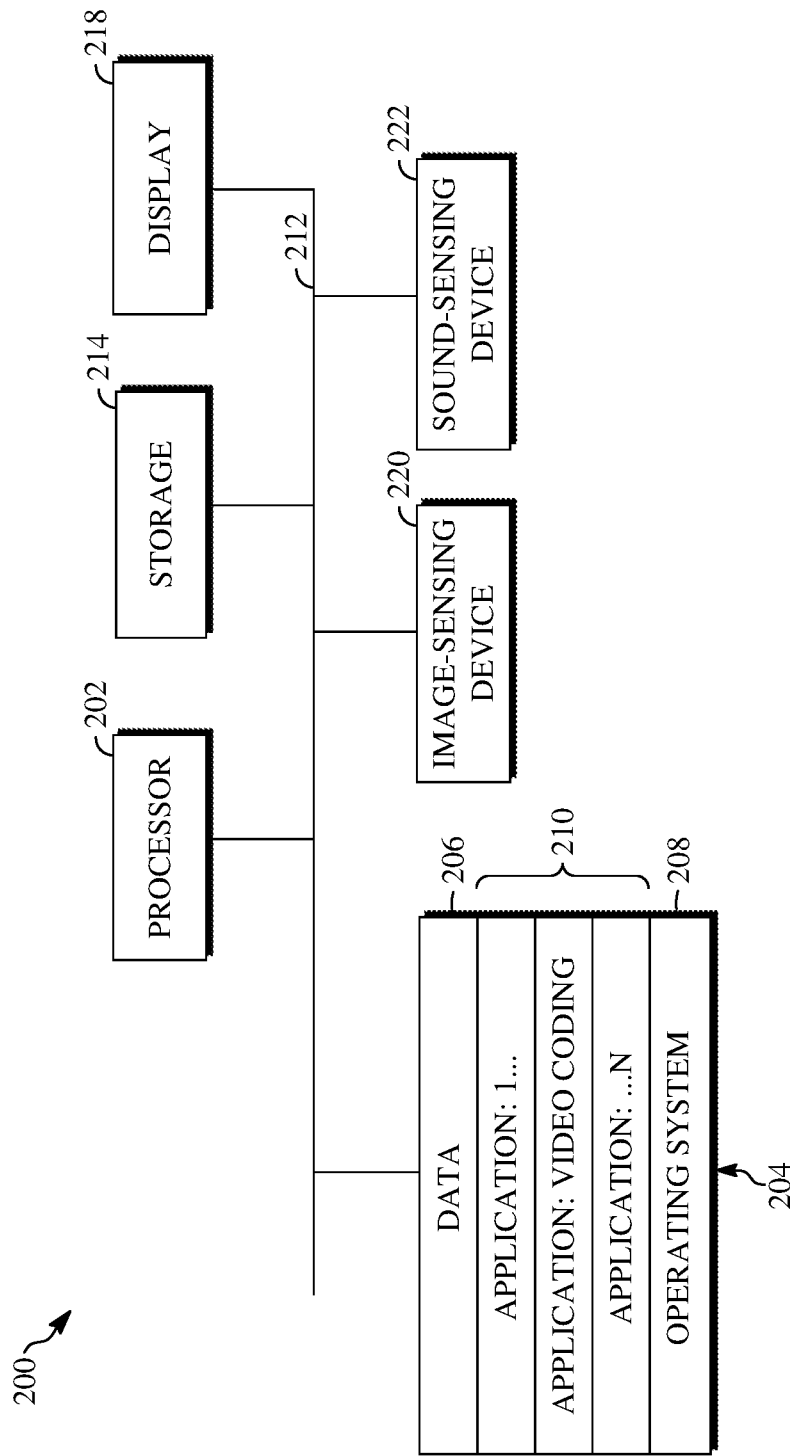
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image. In such an implementation, the transmitting station 102 may be used to encode the image data and the receiving station 106 may be used to decode the image data. Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video or image coding application that performs the techniques described herein. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
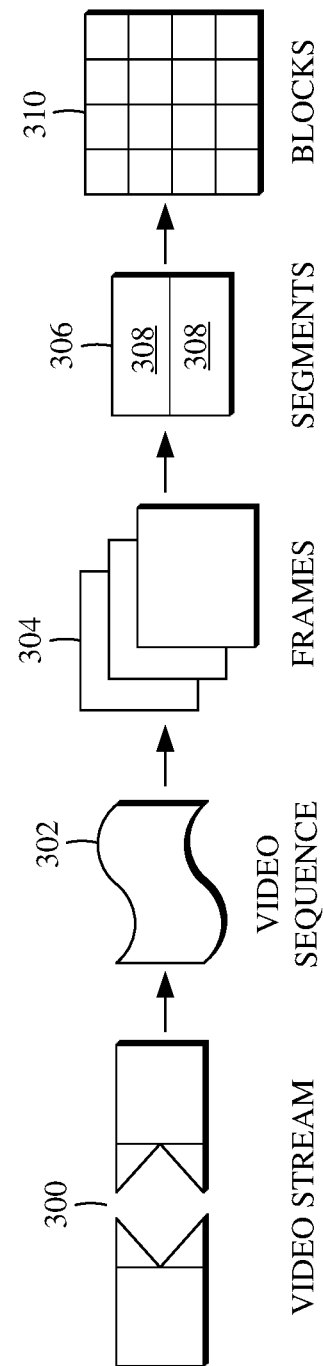
FIG. 3 is a diagram of an example of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
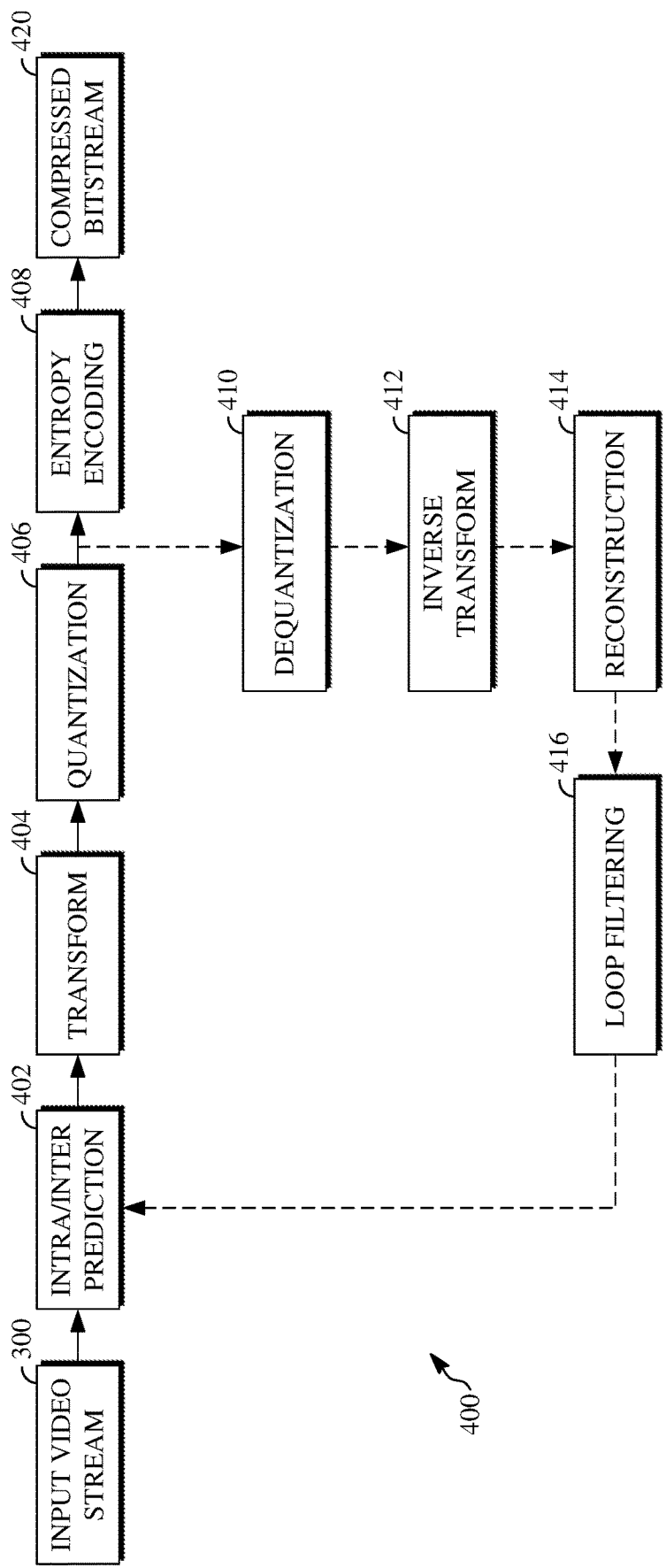
FIG. 4 is a block diagram of an example of an encoder according to implementations of this disclosure.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
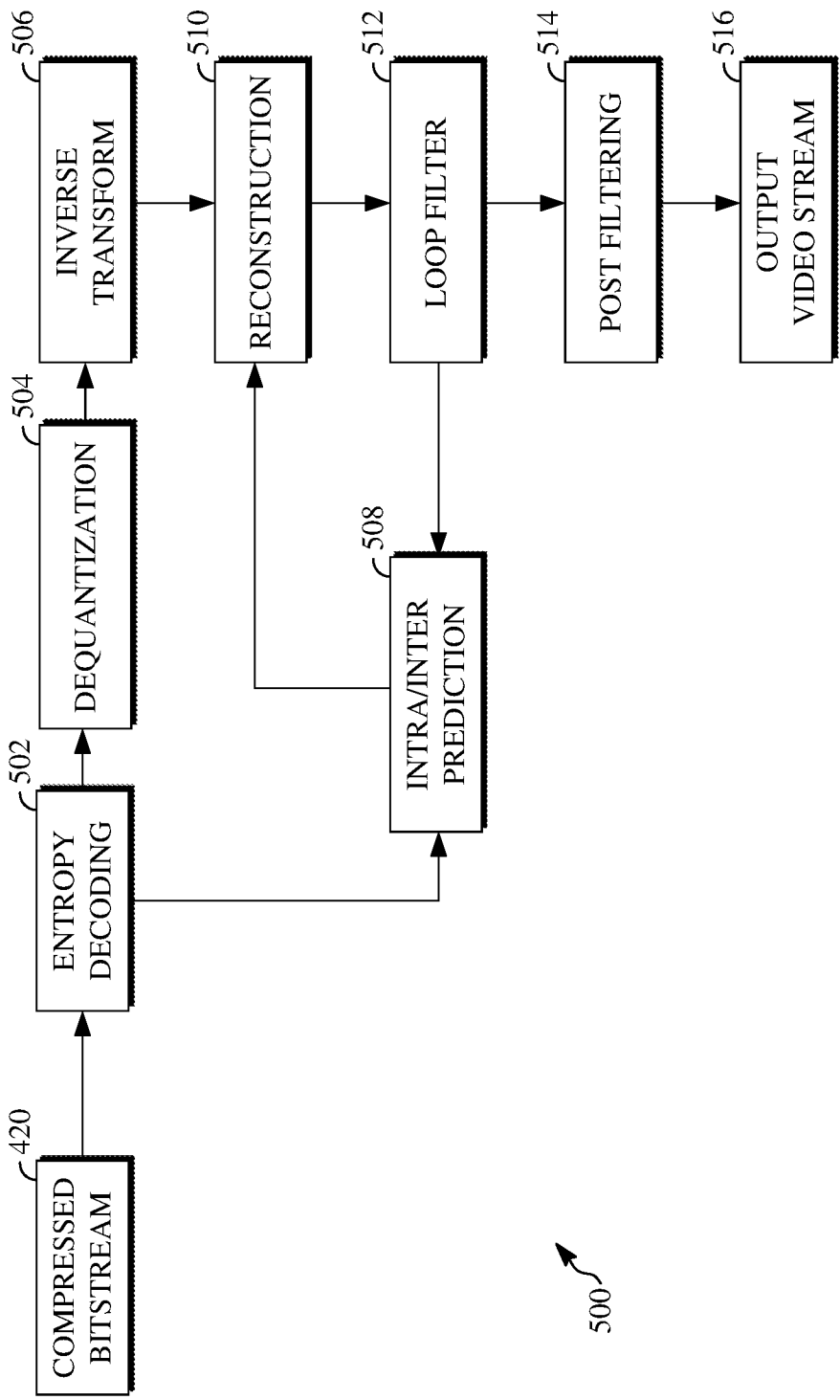
FIG. 5 is a block diagram of an example of a decoder according to implementations of this disclosure.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. In some implementations, the decoder 500 can produce the output video stream 516 without the deblocking filtering stage 514.

Figure 6:
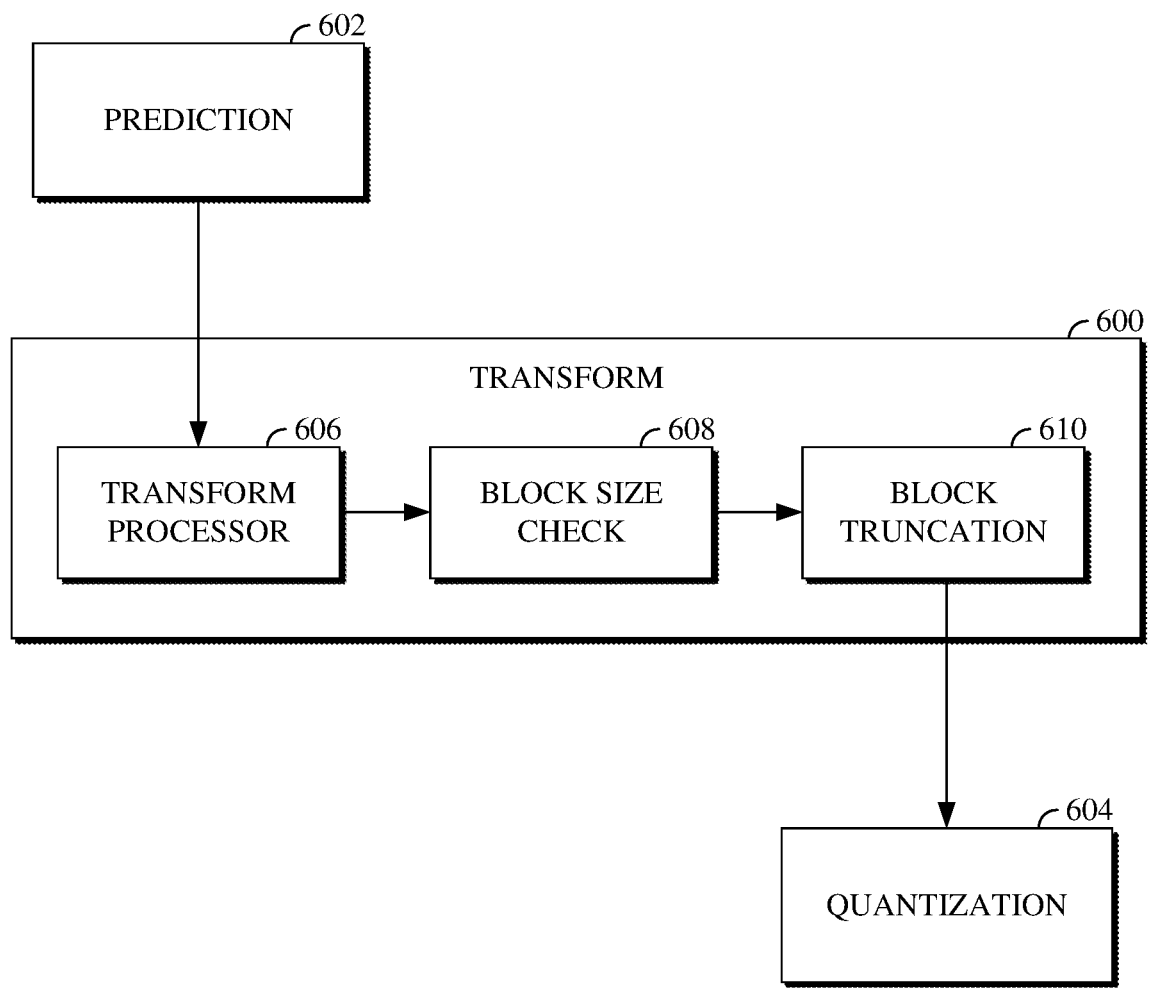
FIG. 6 is a block diagram of example of functionality of a transform stage used to transform a large prediction residual block.

FIG. 6 is a diagram of example of functionality of a transform stage 600 used to transform a large prediction residual block. The transform stage 600 may, for example, be or include the transform stage 404 shown in FIG. 4. The prediction residual block may be block representing a prediction residual generated using a prediction stage 602, which may, for example, be or include the intra/inter prediction stage 402 shown in FIG. 4. After generating the prediction residual block, the transform stage 600 outputs the transformed prediction residual data within a transform block to a quantization stage 604, which may, for example, be the quantization stage 406 shown in FIG. 4.

The transform stage 600 includes a transform processor mechanism 606, a block size check mechanism 608, and a block truncation mechanism 610. The transform processor mechanism 606 transforms the pixel values of the prediction residual block to produce transform coefficients. The transform processor mechanism 606 transforms the pixel values of the prediction residual block according to a transform type (e.g., DCT) and a transform size. For example, the transform processor mechanism 606 can perform a transform search to determine an optimal transform type and an optimal transform size to use to transform the pixel values of the prediction residual block. The transform size may be selected based on a size of the prediction residual block.

The block size check mechanism 608 determines whether a large transform size was used to transform the prediction residual block. A large transform size refers to a size larger than 32×32. For example, a large transform size may be 32×64, 64×32, or 64×64. However, the large transform size may be a size defined based on the capabilities of the encoder that uses the transform stage 600 (e.g., the encoder 400 shown in FIG. 4). As such, in another example, a large transform size may be a size larger than 64×64.

The block size check mechanism 608 determines whether a large transform size was used by comparing the number of transform coefficients produced using the transform processor mechanism 606 to a threshold cardinality. The threshold cardinality represents a maximum transform block size (e.g., 32×32). That is, the threshold cardinality is the number of transform coefficients included within a transform block of the maximum transform block size.

The block truncation mechanism 610 selects which of the transform coefficients produced using the transform processor mechanism 606 will be included in a transform block generated using the transform stage 600. Where a determination is made that a large transform size was used to transform the prediction residual block, the block truncation mechanism 610 selects some of the transform coefficients and discards the rest. Discarding a transform coefficient can refer to deleting the data indicative or otherwise representative of the transform coefficient. Alternatively, discarding a transform coefficient can refer to ignoring the data indicative or otherwise representative of the transform coefficient, such as by flagging it. For example, flagged transform coefficients may not be included in the transform block generated using the transform coefficients.

The operations performed at the transform stage 600 can reduce the number of computations necessary for producing a transform block. For example, the transform stage 600 can remove one fourth of the computations needed by a typical transform stage to produce a transform block, such as due to the discarding of the transform coefficients. Other optimizations are also possible. Further, the transform block output from the transform stage 600 to the quantization stage 604 can be processed using typical scan patterns and quantization processes available to transform blocks generated for non-large prediction residual blocks (e.g., prediction residual blocks having a size of 32×32 or smaller). For example, the quantization stage 604 can use an M×N (e.g., 32×32, 16×32, etc.) quantization matrix to quantize the transform block output from the transform stage 600. The resulting quantized transform coefficients can then be entropy encoded, such as using a raster scan, zigzag, Z-shaped, or other scan order. The use of typical scan patterns and quantization processes obviates additional memory requirements.

In some implementations, the transform processor mechanism 606 performs a transform search against the pixel values of the prediction residual block. Performing the transform search includes determining rate-distortion values resulting from transforming the pixel values of the prediction residual block using different candidate combinations of transform types (e.g., DCT) and transform sizes. The one of the candidate combinations resulting in a lowest one of the rate-distortion values can then be selected. Data indicative of the selected transform type and transform size combination can be encoded to the bitstream, such as within syntax elements encoded to a block header for the current block, a frame header for the video frame, or the like.

In some implementations, the transform processor mechanism 606 can generate a transform block including the transform coefficients it produces. For example, the transform block generated using the transform processor mechanism 606 can be a first transform block having a size equal to a size of the prediction residual block received from the prediction stage 602. The block size check mechanism 608 can then determine whether a large transform size was used to transform the prediction residual block based on the size of the first transform block.

Where it is determined that a large transform size was used to transform the prediction residual block, the block truncation mechanism 610 can discard all of the transform coefficients except the transform coefficients located within an M×N (e.g., 32×32, 16×32, or smaller) space of the first transform block. As such, the block truncation mechanism 610 selects a first portion of the transform coefficients located within that M×N space and discards a second portion of the transform coefficients located outside of that M×N space. The M×N space may, for example, be the top-left most sub-block of the first transform block.

In some implementations, discarding the second portion of the transform coefficients can include generating a second transform block using only the first portion of the transform coefficients. For example, instead of deleting transform coefficients from the first transform block in which the first transform block remains the same size, a second transform block can be generated. The second transform block has a size corresponding to the number of transform coefficients within the first portion (e.g., the remaining transform coefficients).

In some implementations, the block truncation mechanism 610 can discard a number of the transform coefficients such that the remaining number of transform coefficients is less than the threshold cardinality. For example, where the threshold cardinality represents a 32×32 maximum transform block size, the block truncation mechanism 610 can discard a number of the transform coefficients such that the remaining number represents a 32×16, 16×32, 16×16, or smaller transform block size.

In some implementations, the block size check mechanism 608 may be omitted. For example, the determination of whether a large transform size was used to transform the prediction residual block can instead be made based on the operations performed by the transform processor mechanism 606. That is, a determination that a large transform size is used can be made simply by the use of a transform size greater than 32×32 by the transform processor mechanism 606.

In some implementations, the transform stage 600 can be used to process data other than video data. For example, the transform stage 600 can be used to process image data. The image data may include a block of data from an image. In such an implementation, the prediction stage 602 may be omitted or may be limited to using intra prediction modes. The transform operations may thus be performed on the image data rather than predicted video data.

Figure 7:
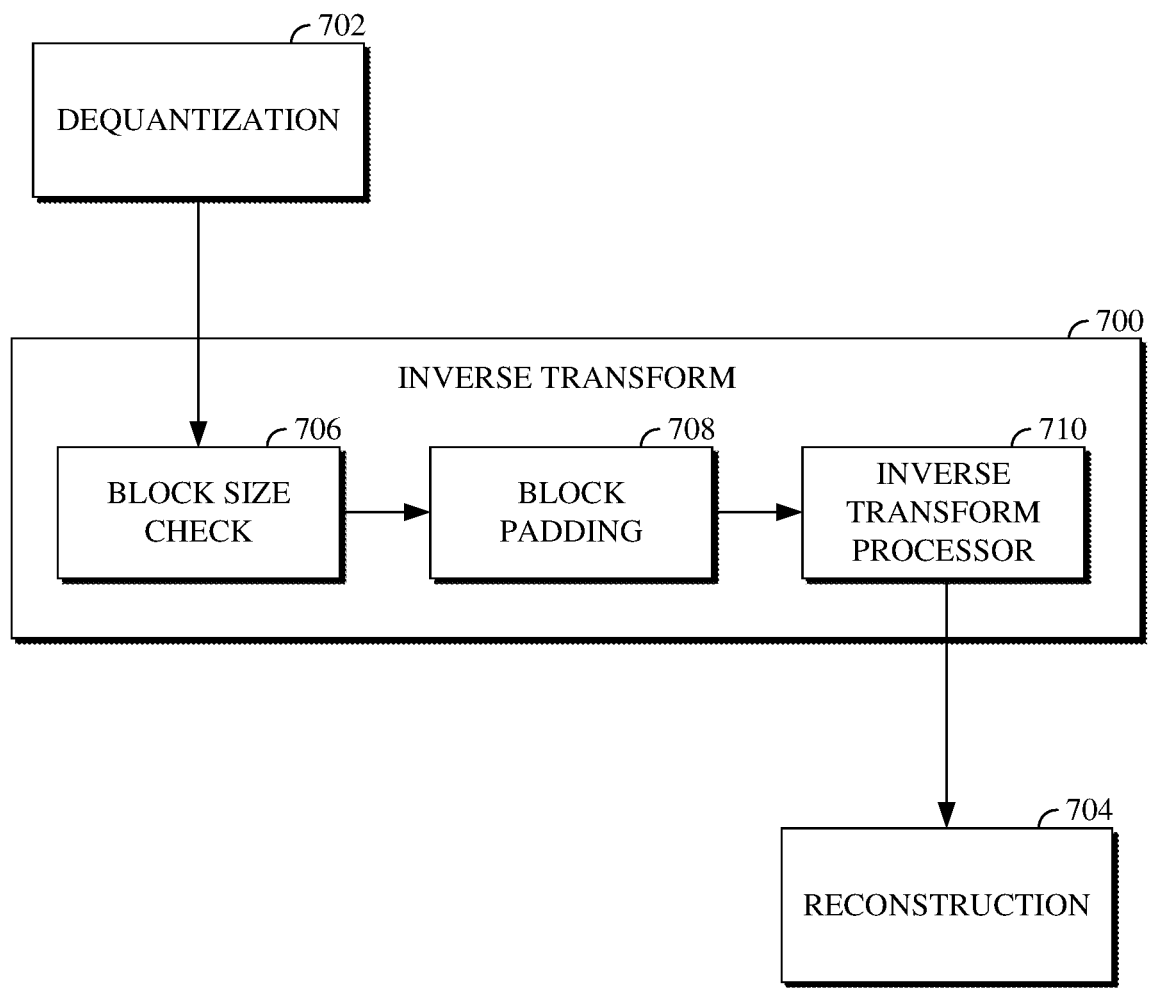
FIG. 7 is a block diagram of example of functionality of an inverse transform stage used to inverse transform dequantized coefficients into a large prediction residual block.

FIG. 7 is a block diagram of example of functionality of an inverse transform stage 700 used to inverse transform dequantized coefficients into a large prediction residual block. The inverse transform stage 700 may, for example, be or include the inverse transform stage 506 shown in FIG. 5. The dequantized coefficients may be coefficients decoded from a bitstream (e.g., the compressed bitstream 420 shown in FIG. 5) and dequantized using a dequantization stage 702, which may, for example, be or include the dequantization stage 504 shown in FIG. 5. After dequantizing the encoded data to produce the dequantized coefficients, the inverse transform stage 700 outputs the inverse transformed dequantized coefficients as pixel values within a prediction residual block to a reconstruction stage 704, which may, for example, be the intra/inter prediction stage 508 shown in FIG. 5.

The inverse transform stage 700 includes a block size check mechanism 706, a block padding mechanism 708, and an inverse transform processor mechanism 710. The block size check mechanism 706 determines whether a large transform size was used to transform the transform coefficients dequantized at the dequantization stage 702. The block size check mechanism 706 determines whether a large transform size was used based on syntax elements decoded from the bitstream to which the transform coefficients were encoded. For example, the syntax elements can be data encoded to a block, frame, or other header within the bitstream and which indicates the transform size used.

The block padding mechanism 708 adds new coefficients to the transform coefficients where a determination was made that a large transform size was used. Adding the new coefficients includes adding a number of zero-value coefficients to the transform block to cause the size of the transform block to increase to the large transform size. For example, where a 64×64 transform size was used to produce the transform coefficients of the transform block and the transform block is of size 32×32, the block padding mechanism 708 adds three 32×32 sub-blocks full of zero-value coefficients to cause the transform block to increase to 64×64. In another example, where a 64×32 transform size was used to produce the transform coefficients of the transform block and the transform block is of size 32×32, the block padding mechanism adds one 32×32 sub-block full of zero-value coefficients to cause the transform block to increase to 64×32.

Adding the new coefficients can include not moving the locations of the existing transform coefficients within the transform block. For example, where a 64×64 transform size was used to produce the transform coefficients of the transform block and the transform block is of size 32×32, the existing transform coefficients will remain in the top-left most corner of the transform block. The three 32×32 sub-blocks to be added will be positioned to the right, bottom, and bottom-right of those existing transform coefficients.

The inverse transform processor mechanism 710 inverse transforms the coefficients of the transform block (e.g., the transform coefficients dequantized using the dequantization stage 702 and the new coefficients added using the block padding mechanism 708) to produce a prediction residual block for the current block. The inverse transform stage 700 outputs the prediction residual block to the reconstruction stage 704, which reconstructs the current block from the prediction residual block. The operations performed at the inverse transform stage 700 can reduce the number of computations necessary for inverse transforming transform coefficients. For example, the inverse transform stage 700 can use one fourth fewer computations compared to a typical inverse transform stage used to inverse transform coefficients, such as due to the padding of the added transform coefficients. Other optimizations are also possible. For example, the second half of the transform coefficients can be assumed to be zero values.

In some implementations, the block padding mechanism 708 can generate a new transform block including the transform coefficients dequantized using the dequantization stage 702 and the new coefficients it adds thereto. For example, the transform block including the transform coefficients dequantized using the dequantization stage 702 can be a first transform block having a size equal to a size of the dequantization matrix used at the dequantization stage 702. The block padding mechanism 708 can then generate a second transform block that includes the transform coefficients dequantized using the dequantization stage 702 and the new coefficients to be added thereto.

In some implementations, the inverse transform stage 700 can be used to process data other than video data. For example, the inverse transform stage 700 can be used to process image data. The image data may include a block of data from an image. The inverse transform operations may thus be performed on encoded image data rather than encoded video data.

Figure 8:
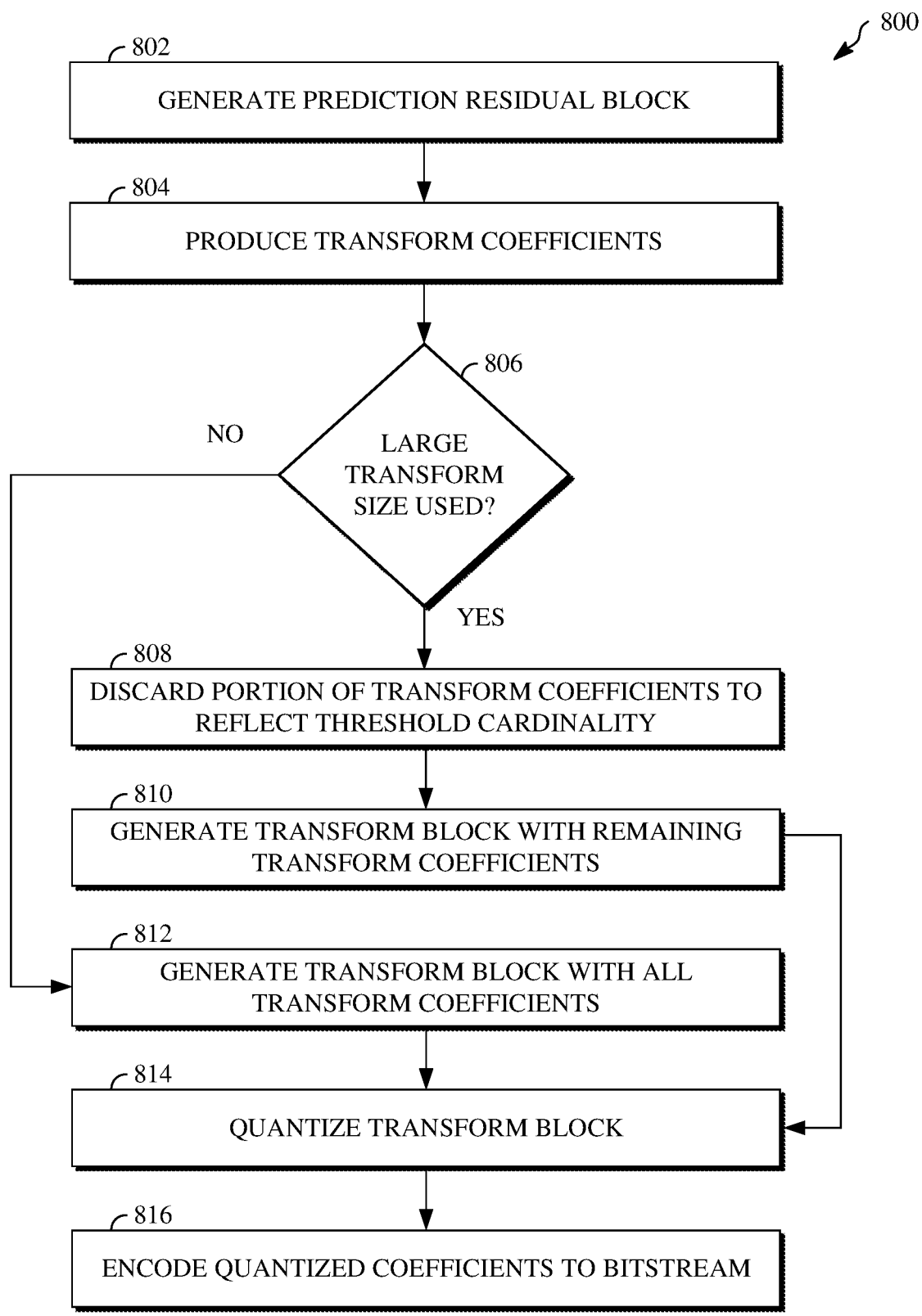
FIG. 8 is a flowchart diagram of an example of a technique for transforming a large prediction residual block for a current block.
Figure 9:
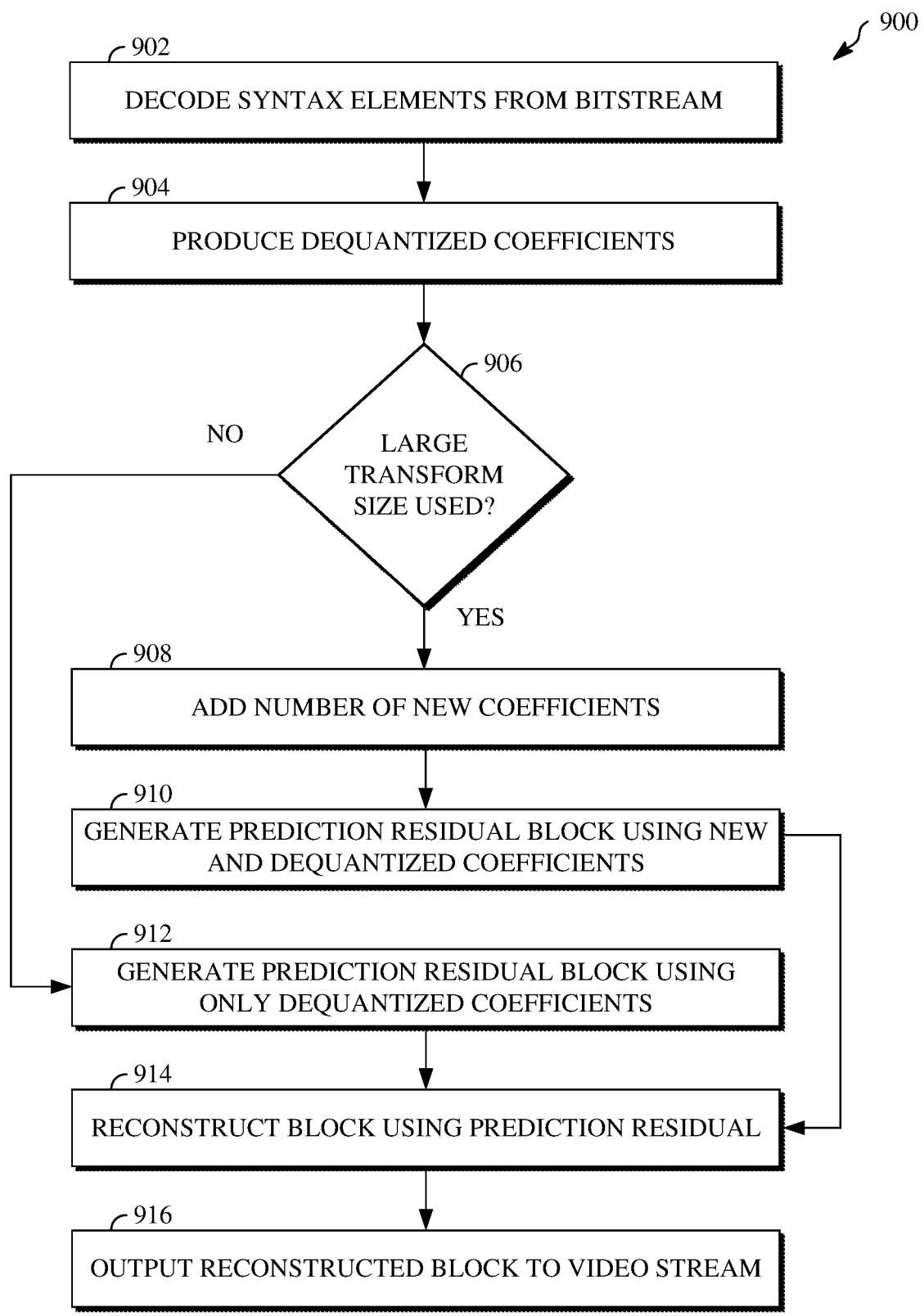
FIG. 9 is a flowchart diagram of an example of a technique for inverse transforming dequantized coefficients of a current block into a large prediction residual block.

Techniques for improved transforms for large video and image blocks are now described with respect to FIGS. 8 and 9. FIG. 8 is a flowchart diagram of an example of a technique 800 for transforming a large prediction residual block for a current block. FIG. 9 is a flowchart diagram of an example of a technique 900 for inverse transforming dequantized coefficients of a current block into a large prediction residual block.

The technique 800, the technique 900, or both can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 800, the technique 900, or both. The technique 800, the technique 900, or both can be implemented using specialized hardware or firmware. For example, a hardware component configured to perform the technique 800, the technique 900, or both. As explained above, some computing devices may have multiple memories or processors, and the operations described in the technique 800 or the technique 900 can be distributed using multiple processors, memories, or both.

For simplicity of explanation, the techniques described with respect to FIGS. 8 and 9 are each depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 8, the technique 800 for transforming a large prediction residual block for a current block. At 802, a prediction residual block is generated for the current block. Generating the prediction residual block includes performing intra/inter prediction against the current block to generate a prediction block and then determining the difference between the current block and the prediction block. For example, the prediction residual block can be generated using the intra/inter prediction stage 402 shown in FIG. 4.

At 804, transform coefficients are produced by transforming pixel values of the prediction residual block. Transforming the pixel values of the prediction residual block can include transforming the pixel values using a transform type and a transform size. The transform type may, for example, be the discrete cosine transform or a different transform type. The transform size may be a size equal to or smaller than a size of the prediction residual block. For example, where the prediction residual block is a 64×64 block, the transform size may be 64×64, 64×32, 32×64, or smaller.

At 806, a determination is made as to whether a large transform size was used to produce the transform coefficients. Determining whether a large transform size was used to produce the transform coefficients includes determining whether the transform coefficients exceed a threshold cardinality. The threshold cardinality represents a maximum transform block size (e.g., 32×32). That is, the threshold cardinality is the number of transform coefficients included within a transform block of the maximum transform block size. Determining whether the transform coefficients exceed the threshold cardinality includes comparing the number of transform coefficients to the threshold cardinality.

Responsive to determining that a large transform size was used to produce the transform coefficients, at 808, a portion of the transform coefficients is discarded. Discarding the portion of the transform coefficients includes discarding a number of the transform coefficients such that a remaining number of the transform coefficients does not exceed the threshold cardinality. The portion of the transform coefficients to be discarded can be based on the total number of transform coefficients, and, therefore, based on the size of the prediction residual block.

For example, when the size of the prediction residual block is 64×64, three quarters of the transform coefficients are discarded such that the remaining transform coefficients are represented by a 32×32 block. In another example, when the size of the prediction residual block is 32×64 or 64×32, one half of the transform coefficients are discarded such that the remaining transform coefficients are represented by a 32×32 block.

At 810, a transform block is generated using the remaining number of the transform coefficients. Alternatively, responsive to determining that a large transform size was not used to produce the transform coefficients, at 812, a transform block is generated using all of the transform coefficients. At 814, the transform coefficients within the transform block generated at either 810 or 812 are quantized to produce quantized transform coefficients. As such, the quantizing of the transform block generated at 812 will result a greater number of quantized transform coefficients than the quantizing of the transform block generated at 810. At 816, the quantized transform coefficients are encoded.

In some implementations, the technique 800 includes performing a transform search against the pixel values of the prediction residual block. Performing the transform search includes determining rate-distortion values resulting from transforming the pixel values of the prediction residual block using different candidate combinations of transform types (e.g., DCT) and transform sizes. The one of the candidate combinations resulting in a lowest one of the rate-distortion values can then be selected. Data indicative of the selected transform type and transform size combination can be encoded to the bitstream, such as within syntax elements encoded to a block header for the current block, a frame header for the video frame, or the like.

In some implementations, determining whether the transform coefficients exceed the threshold cardinality can include comparing the size of the prediction residual block to the threshold cardinality. For example, the size of the prediction residual block can be compared to the maximum transform block size represented by the threshold cardinality. A determination that a large transform size was used to produce the transform coefficients can thus be made by determining that the size of the prediction residual block is larger than the maximum transform block size.

In some implementations, the operations for determining whether a large transform size was used to produce the transform coefficients may not include operations separate from the operations for producing the transform coefficients. For example, the determination as to whether a large transform size was used to produce the transform coefficients can be made by the transforming of the pixel values of the prediction residual block, such as based on a transform sized used therefor.

In some implementations, the technique 800 can be used to process data other than video data. For example, the technique 800 can be used to process image data. The image data may include a block of data from an image. In such an implementation, the technique 800 may omit operations for generating the prediction residual block or may be limited to using intra prediction modes to generate it. The transform operations may thus be performed on a block of pixel values of the image rather than predicted video data.

Referring next to FIG. 9, the technique 900 for inverse transforming dequantized coefficients of a current block into a large prediction residual block is shown. At 902, syntax data is decoded from a bitstream. The bitstream may, for example, be the compressed bitstream 420 shown in FIG. 4 or another bitstream output by an encoder. The syntax data may represent syntax elements, such as which may be encoded to a block header of the current block, a frame header of the video frame that includes the current block, or the like.

In particular, the syntax data includes data representing the quantized transform coefficients of the current block, which were encoded to the bitstream, as well as the transform type and transform size used by the encoder to produce those quantized transform coefficients. The quantized transform values are dequantized after being decoded from the bitstream. At 904, transform coefficients are produced by dequantizing the quantized transform coefficients of the current block decoded from the bitstream.

At 906, a determination is made as to whether a large transform size was used to produce the transform coefficients. The determination is made based on syntax elements decoded from the bitstream to which the transform coefficients were encoded. Responsive to a determination that a large transform size was used to produce the transform coefficients, at 908, a number of new coefficients is added to the transform coefficients. Adding the new coefficients includes adding a number of zero-value coefficients to the current transform coefficients such that the total number of transform coefficients exceeds a threshold cardinality.

The number of new coefficients to add is based on the number of current transform coefficients decoded and dequantized from the bitstream and the specific large transform size used. For example, where the number of current transform coefficients is represented by a 32×32 transform block and the transform size used to produce them is 64×64, three 32×32 sub-blocks full of zero-value coefficients are added. At 910, a prediction residual block is generated based on the total number of transform coefficients. Generating the prediction residual block includes inverse transforming the transform coefficients (subsequent to the new coefficients being added) according to the transform type indicated by the decoded syntax elements.

Alternatively, responsive to a determination that a large transform size was not used to produce the transform coefficients, at 912, a prediction residual block is generated based on the transform coefficients decoded and dequantized from the bitstream alone. At 914, the prediction residual block is reconstructed to generate a reconstructed block. At 916, the reconstructed block is output to a video stream, for example, the output video stream 516 shown in FIG. 5.

In some implementations, the technique 900 can be used to process data other than video data. For example, the technique 900 can be used to process image data. The image data may include a block of data from an image. In such an implementation, the technique 900 may omit operations for generating the prediction residual block or may be limited to using intra prediction modes to generate it. The inverse transform operations may thus be performed on encoded image data rather than encoded video data.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for decoding an encoded block, the method comprising:
    decoding quantized transform coefficients of the encoded block from a bitstream;
    dequantizing the quantized transform coefficients to produce a first number of transform coefficients associated with a transform block having a first size;
    determining, based on one or more syntax elements within the bitstream, whether the first number of transform coefficients were encoded using a transform size which exceeds a threshold;
    responsive to determining that the first number of transform coefficients were encoded using a transform size which exceeds the threshold, adding one or more zero value coefficients to the first number of transform coefficients to result in a second number of transform coefficients which is greater than the first number of transform coefficients;
    inverse transforming the second number of transform coefficients to produce a prediction residual having a second size which is greater than the first size;
    reconstructing a video block using the prediction residual and a prediction block for the encoded block; and
    outputting the video block for storage or display.

2. The method of claim 1, wherein the first size is 32×32, the first number of transform coefficients includes 1,024 coefficients, and the transform size is 64×64, and wherein adding the one or more zero value coefficients to the first number of transform coefficients to result in the second number of transform coefficients comprises:
    adding 3,072 zero value coefficients to the 1,024 coefficients of the first number of transform coefficients to result in 4,096 coefficients of the second number of transform coefficients.

3. The method of claim 2, wherein a transform block resulting from the adding includes four sub-blocks each having a size of 32×32, wherein a first sub-block of the four sub-blocks includes the 1,024 coefficients of the first number of transform coefficients, and wherein the first sub-block is located in an upper-left corner of the transform block.

4. The method of claim 1, wherein the first size is 32×32, the first number of transform coefficients includes 1,024 coefficients, and the transform size is 32×64 or 64×32, and wherein adding the one or more zero value coefficients to the first number of transform coefficients to result in the second number of transform coefficients comprises:
    adding 1,024 zero value coefficients to the 1,024 coefficients of the first number of transform coefficients to result in 2,048 coefficients of the second number of transform coefficients.

5. The method of claim 4, wherein a transform block resulting from the adding includes two sub-blocks each having a size of 32×32, wherein a first sub-block of the two sub-blocks includes the 1,024 coefficients of the first number of transform coefficients, and wherein the first sub-block is located in an upper-left corner of the transform block.

6. The method of claim 1, wherein adding the one or more zero value coefficients to the first number of transform coefficients to result in the second number of transform coefficients comprises:
    generating a new transform block having the second size, the new transform block including a first sub-block and one or more second sub-blocks, wherein the first sub-block includes the first number of transform coefficients, wherein the one or more second sub-blocks include the one or more zero value coefficients.

7. The method of claim 6, wherein the first sub-block is located in an upper-left corner of the new transform block.

8. The method of claim 1, wherein the second size is the transform size.

9. An apparatus for decoding an encoded block, the apparatus comprising:
    a processor configured to execute instructions stored in a non-transitory storage medium to:
        decode quantized transform coefficients of the encoded block from a bitstream;
        dequantize the quantized transform coefficients to produce a first number of transform coefficients associated with a transform block having a first size;
        determine, based on one or more syntax elements within the bitstream, whether the first number of transform coefficients were encoded using a transform size which exceeds a threshold;
        responsive to a determination that the first number of transform coefficients were encoded using a transform size which exceeds the threshold:
            add one or more zero value coefficients to the first number of transform coefficients to result in a second number of transform coefficients which is greater than the first number of transform coefficients; and
            inverse transform the second number of transform coefficients to produce a first prediction residual having a second size which is greater than the first size; and
        responsive to a determination that the first number of transform coefficients were not encoded using a transform size which exceeds the threshold:
            inverse transform the first number of transform coefficients to produce a second prediction residual having the first size;
        reconstruct a video block using a prediction block for the encoded block and using the first prediction residual or the second prediction residual; and
        output the video block for storage or display.

10. The apparatus of claim 9, wherein the first size is 32×32, the first number of transform coefficients includes 1,024 coefficients, and the transform size is 64×64, and wherein the instructions to add the one or more zero value coefficients to the first number of transform coefficients to result in the second number of transform coefficients include instructions to:
    add 3,072 zero value coefficients to the 1,024 coefficients of the first number of transform coefficients to result in 4,096 coefficients of the second number of transform coefficients.

11. The apparatus of claim 10, wherein a transform block resulting from the adding includes four sub-blocks each having a size of 32×32, wherein a first sub-block of the four sub-blocks includes the 1,024 coefficients of the first number of transform coefficients, and wherein the first sub-block is located in an upper-left corner of the transform block.

12. The apparatus of claim 9, wherein the first size is 32×32, the first number of transform coefficients includes 1,024 coefficients, and the transform size is 32×64 or 64×32, and wherein the instructions to add the one or more zero value coefficients to the first number of transform coefficients to result in the second number of transform coefficients include instructions to:
    add 1,024 zero value coefficients to the 1,024 coefficients of the first number of transform coefficients to result in 2,048 coefficients of the second number of transform coefficients.

13. The apparatus of claim 12, wherein a transform block resulting from the adding includes two sub-blocks each having a size of 32×32, wherein a first sub-block of the two sub-blocks includes the 1,024 coefficients of the first number of transform coefficients, and wherein the first sub-block is located in an upper-left corner of the transform block.

14. The apparatus of claim 9, wherein the instructions to add the one or more zero value coefficients to the first number of transform coefficients to result in the second number of transform coefficients include instructions to:
    generate a new transform block having the second size, the new transform block including a first sub-block and one or more second sub-blocks, wherein the first sub-block includes the first number of transform coefficients, wherein the one or more second sub-blocks include the one or more zero value coefficients.

15. The apparatus of claim 14, wherein the first sub-block is located in an upper-left corner of the new transform block.

16. The apparatus of claim 9, wherein the second size is the transform size.

17. A method for decoding an encoded block, the method comprising:
    dequantizing quantized transform coefficients of the encoded block to produce a first number of transform coefficients associated with a transform block having a first size;
    responsive to determining, based on one or more syntax elements within a bitstream from which the quantized transform coefficients are decoded, that the first number of transform coefficients were encoded using a transform size which exceeds a threshold, adding one or more zero value coefficients to the first number of transform coefficients to result in a second number of transform coefficients which is greater than the first number of transform coefficients;
    inverse transforming the second number of transform coefficients to produce a prediction residual having a second size which is greater than the first size; and processing the prediction residual to produce a decoded video block for output or display.

18. The method of claim 17, wherein adding the one or more zero value coefficients to the first number of transform coefficients to result in the second number of transform coefficients comprises:

generating a new transform block having the second size, the new transform block including a first sub-block and one or more second sub-blocks, wherein the first sub-block includes the first number of transform coefficients, wherein the one or more second sub-blocks include the one or more zero value coefficients.

19. The method of claim 17, wherein:

when the first size is 32×32, the first number of transform coefficients includes 1,024 coefficients, and the transform size is 64×64, adding the one or more zero value coefficients to the first number of transform coefficients to result in the second number of transform coefficients comprises adding 3,072 zero value coefficients to the 1,024 coefficients of the first number of transform coefficients to result in 4,096 coefficients of the second number of transform coefficients, and when the first size is 32×32, the first number of transform coefficients includes 1,024 coefficients, and the transform size is 32×64 or 64×32, adding the one or more zero value coefficients to the first number of transform coefficients to result in the second number of transform coefficients comprises adding 1,024 zero value coefficients to the 1,024 coefficients of the first number of transform coefficients to result in 2,048 coefficients of the second number of transform coefficients.

* * * * *